United States Patent
Rasmussen

[19]

[11] Patent Number: 5,813,368
[45] Date of Patent: Sep. 29, 1998

[54] HAND-HELD DOG RESTRAINT

[76] Inventor: Harvey Rasmussen, 53 W. Pacific, #17, Henderson, Nev. 89105

[21] Appl. No.: 886,367

[22] Filed: Jul. 1, 1997

[51] Int. Cl.$^6$ .................................................... A01K 27/00
[52] U.S. Cl. .......................................... 119/799; 248/188.6
[58] Field of Search ..................... 119/792, 795, 119/797, 799; 273/84 R, 187; 248/155.4, 155.5, 188.6; 42/1.16

[56] References Cited

U.S. PATENT DOCUMENTS

| 236,091 | 12/1880 | Rodger | 119/787 |
|---|---|---|---|
| 2,322,897 | 6/1943 | Van Den Bogaerde, Jr. | 119/799 |
| 2,337,970 | 12/1943 | Cassell | 119/799 |
| 2,784,698 | 3/1957 | Dieppa | 119/799 |
| 2,833,249 | 5/1958 | Cornman | 119/799 |
| 3,309,049 | 3/1967 | Allbee, Jr. | 248/188.6 X |
| 4,111,217 | 9/1978 | Victor | 248/188.6 X |
| 4,522,153 | 6/1985 | Vander Horst | 119/799 |
| 4,744,536 | 5/1988 | Bancalari | 248/188.6 X |
| 5,161,768 | 11/1992 | Sarabin | 248/188.6 X |

FOREIGN PATENT DOCUMENTS 437503   4/1912   France ..................................... 119/799

*Primary Examiner*—Robert P. Swiatek
*Assistant Examiner*—Elizabeth Shaw
*Attorney, Agent, or Firm*—Joseph N. Breaux

[57] ABSTRACT

A hand held dog restraint that includes a rigid upper restraint bar; a user positionable wrist loop assembly securable to the upper end of the upper restraint bar; a padded hand grip provided around the upper end portion of the upper restraint bar; a rigid lower restraint bar; a dual pivot hinge assembly pivotally secured between the upper and lower restraint bars; a sliding locking tube slidable into a locking position covering portions of the upper and lower restraint bar and the dual pivot hinge creating one rigid bar; a wrist loop securing bracket extending from the lower restraint bar and having a securing structure to which the wrist loop assembly is securable; and a nylon strap assembly that is securable about the upper and lower rigid restraint bars to secure the hand-held dog restraint in the collapsed configuration.

16 Claims, 2 Drawing Sheets

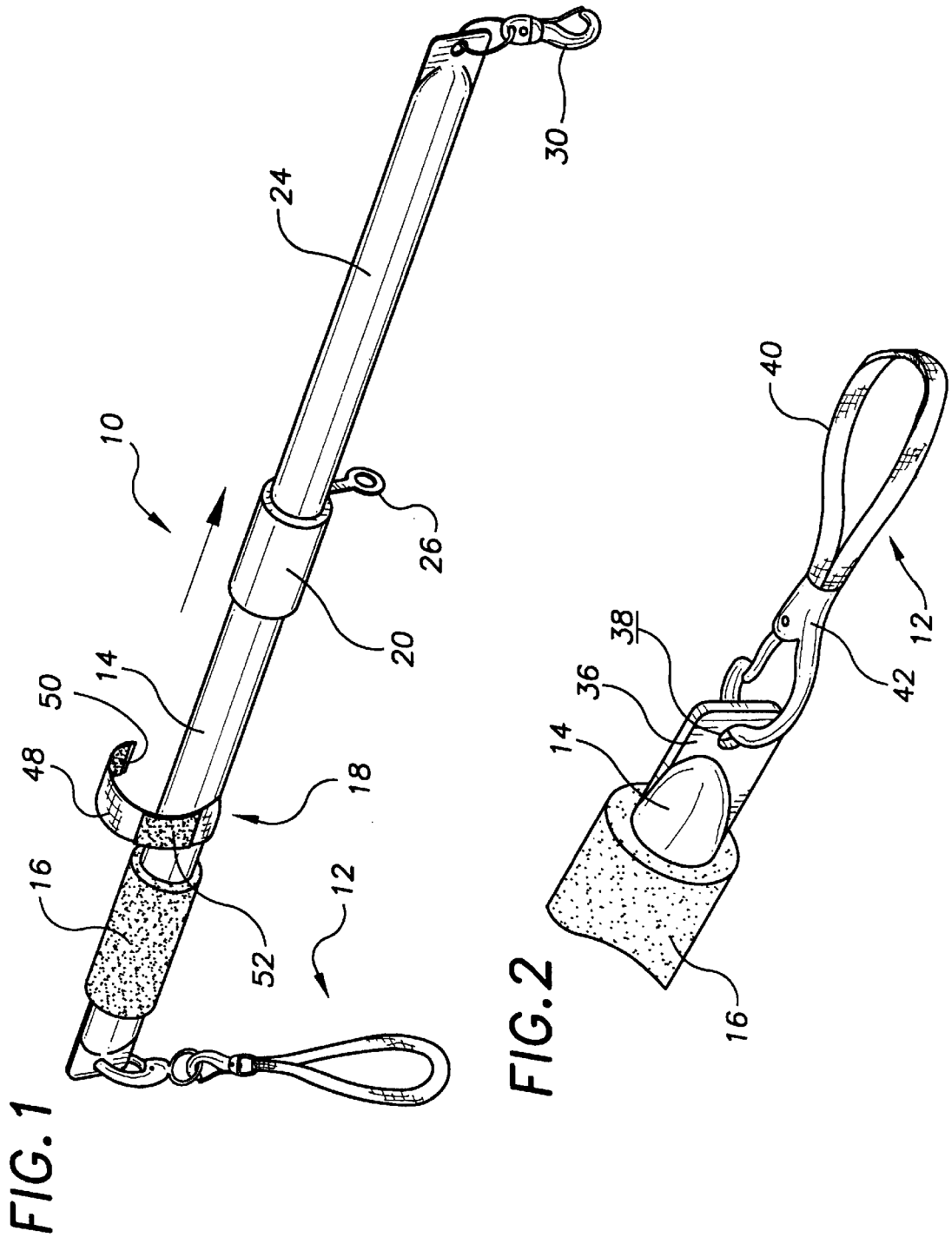

HAND-HELD DOG RESTRAINT

TECHNICAL FIELD

The present invention relates to leash-type restraint devices for dogs and the like and more particularly to a hand-held dog restraint that includes a rigid upper restraint bar; a user positionable wrist loop assembly securable to the upper end of the upper restraint bar; a padded hand grip provided around the upper end portion of the upper restraint bar; a rigid lower restraint bar; a dual pivot hinge assembly pivotally secured between the upper and lower restraint bars; a sliding locking tube slidable into a locking position covering portions of the upper and lower restraint bars and the dual pivot hinge creating one rigid bar; a wrist loop securing bracket extending from the lower restraint bar and having a securing structure to which the wrist loop assembly is securable; and a nylon strap assembly that is securable about the upper and lower rigid restraint bars to secure the hand-held dog restraint in the collapsed configuration.

BACKGROUND OF THE INVENTION

Maintaining control of a large or dangerous dog such as great Dane or a pit bull can be difficult or impossible with a conventional flexible dog leash. It would be a benefit, therefore, to have a hand-held dog restraint that included a rigid member positionable between the dog handler and the dog to allow the dog handler a greater degree of control over the dog. Because it can be desirable to have the dog at different distances from the dog handler during different dog handling situations, it would be desirable to have a hand-held dog restraint that included an adjustable length rigid member that can be positioned between the dog and the dog handler.

SUMMARY OF THE INVENTION

It is thus an object of the invention to provide a hand-held dog restraint that includes a rigid member that is positionable between the dog handler and the dog.

It is a further object of the invention to provide a hand-held dog restraint that includes an adjustable length rigid member that can be positioned between the dog and the dog handler.

It is a still further object of the invention to provide a hand-held dog restraint that includes a rigid upper restraint bar; a user positionable wrist loop assembly securable to the upper end of the upper restraint bar; a padded hand grip provided around the upper end portion of the upper restraint bar; a rigid lower restraint bar; a dual pivot hinge assembly pivotally secured between the upper and lower restraint bars; a sliding locking tube slidable into a locking position covering portions of the upper and lower restraint bars and the dual pivot hinge creating one rigid bar; a wrist loop securing bracket extending from the lower restraint bar and having a securing structure to which the wrist loop assembly is securable; and a nylon strap assembly that is securable about the upper and lower rigid restraint bars to secure the hand-held dog restraint in the collapsed configuration.

It is a still further object of the invention to provide a hand-held dog restraint that some or all of the above objects in combination.

Accordingly, a hand-held dog restraint is provided. The hand held dog restraint includes a rigid upper restraint bar; a user positionable wrist loop assembly securable to the upper end of the upper restraint bar; a padded hand grip provided around the upper end portion of the upper restraint bar; a rigid lower restraint bar; a dual pivot hinge assembly pivotally secured between the upper and lower restraint bars; a sliding locking tube slidable into a locking position covering portions of the upper and lower restraint bars and the dual pivot hinge creating one rigid bar; a wrist loop securing bracket extending from the lower restraint bar and having a securing structure to which the wrist loop assembly is securable; and a nylon strap assembly that is securable about the upper and lower rigid restraint bars to secure the hand-held dog restraint in the collapsed configuration.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

FIG. 1 is a perspective view of an exemplary embodiment of the hand-held dog restraint of the present invention unfolded and locked in the extended configuration showing the user positionable wrist loop assembly secured to the upper end of the upper restraint bar, the padded hand grip provided around the upper end portion of the upper restraint bar, the nylon strap assembly, the sliding locking tube positioned into the locking position, the lower restraint bar, the wrist loop securing bracket extending from the lower restraint bar, and the dog collar attachment clip.

FIG. 2 is a detail perspective view of the user positionable wrist loop assembly clipped to the upper end of the upper restraint bar with the wrist loop assembly attachment clip.

DESCRIPTION OF THE EXEMPLARY EMBODIMENT

Figure 4:
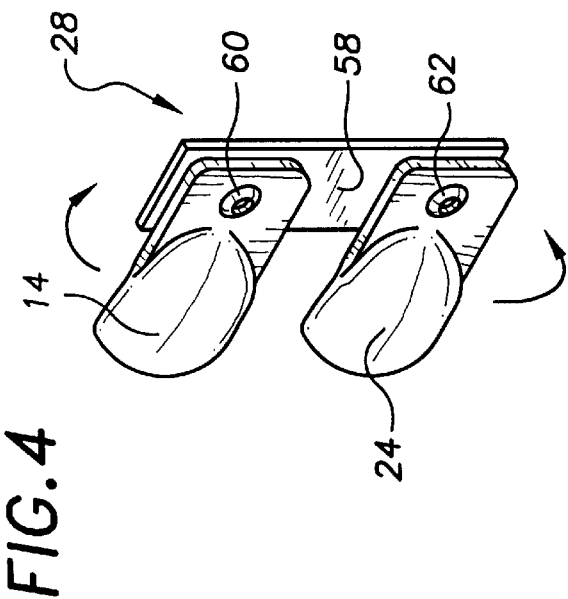
FIG. 4 is a detail perspective view of the dual pivot hinge assembly pivotally secured between the upper and lower restraint bars.

FIG. 1 shows an exemplary embodiment of the hand-held dog restraint of the present invention, generally designated 10, unfolded and locked in the extended configuration. Hand-held dog restraint 10 includes a user positionable wrist loop assembly, generally designated 12; an upper restraint bar 14; a padded hand grip 16; a nylon strap assembly, generally designated 18; a sliding locking tube 20; a lower restraint bar 24; a wrist loop securing bracket 26; a dual pivot hinge assembly, generally designated 28 (FIG. 4); and a dog collar attachment clip 30.

Figure 3:
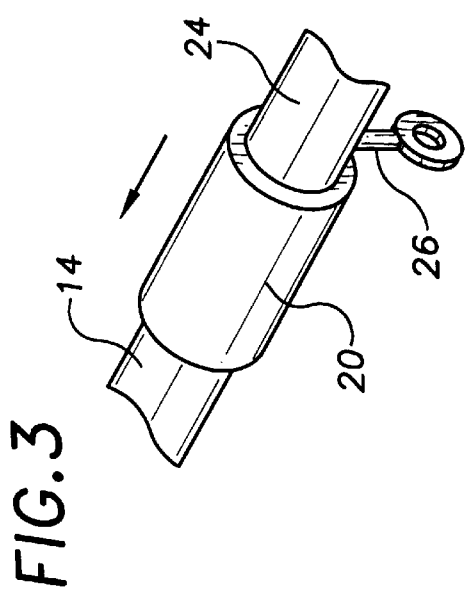
FIG. 3 is a detail perspective view of the sliding locking tube positioned into the locking position.

With reference to FIG. 2, wrist loop assembly 12 includes a nylon webbing wrist loop 40 that is attached to a spring clip mechanism 42. Spring clip mechanism 42 is used to attach wrist loop assembly 12 to either the upper end of upper restraint bar 14 or to wrist loop securing bracket 26 (FIG. 3). In this embodiment wrist loop securing bracket 26 is a conventional eyebolt.

Padded hand grip 16 is a section of foam rubber tubing that has been cut to length and adhesively secured to upper rigid restraint bar 14. With reference back to FIG. 1, nylon strap assembly 18 is a length of woven nylon strapping material 48 and two sections of hook and pile fastener material 50,52. Woven nylon strapping material length 48 is a sufficient length to wrap around upper and lower rigid restraint bars 14,24. A first end of woven nylon strapping material 48 is pop riveted to upper rigid restraint bar 14.

Referring to FIG. 3, sliding locking tube 20 is a section of aluminum tubing that is sized to slide along and over upper and lower rigid restraint bars 14,24 and dual pivot hinge assembly 28 to lock upper and lower rigid restraint bars 14,24 in the open configuration. When in the locking position, sliding lock tube 20 is held in place by gravity and eyebolt 26.

Referring now to FIG. 4, dual pivot hinge assembly 28 includes a hinge plate 58 having a first end pivotally attached to upper rigid restraint bar 14 by a rivet 60 and a second end pivotally attached to lower rigid restraint bar 24 by a rivet 62.

Figure 5:
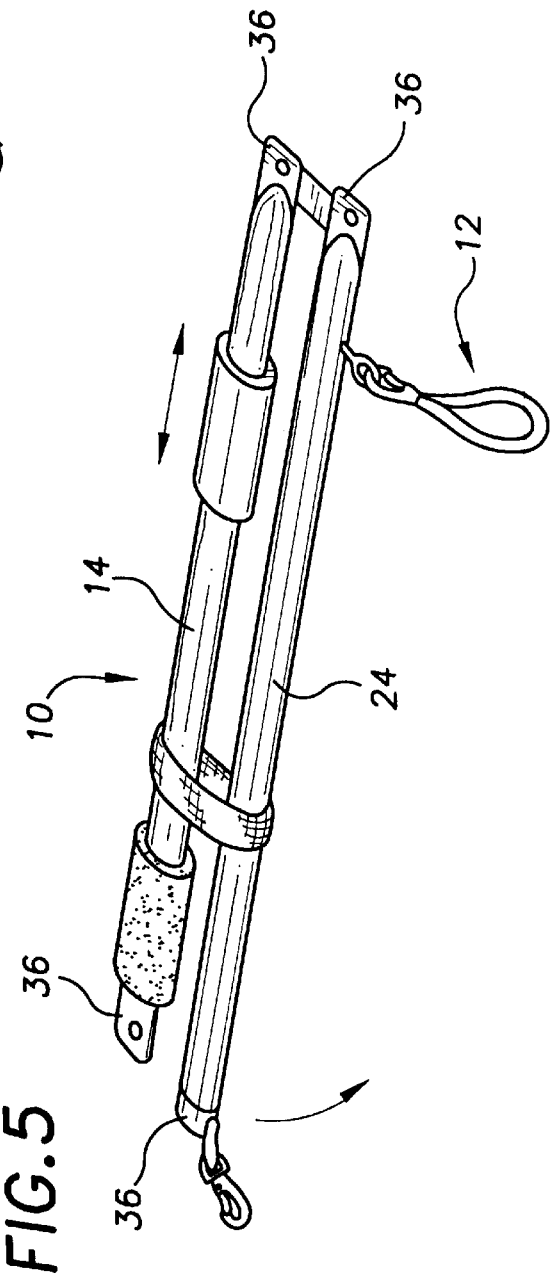
FIG. 5 is a perspective view of the hand-held dog restraint of the present invention folded and secured in the collapsed configuration showing the user positionable wrist loop secured to the wrist loop securing bracket extending from the lower restraint bar and the nylon strap assembly secured about the upper and lower restraint bars.

With reference FIG. 5, in this embodiment upper rigid restraint bar 14 and lower rigid restraint bar 24 are constructed from identical length sections of anodized aluminum tubing that have each had both ends 36 thereof stamped flat and a center hole 38 (see FIG. 2 for example) formed therethrough. Upper and lower rigid restraint bars 14,24 are each two feet in length.

With general reference to FIG. 1–5, in use, hand-held dog restraint 10 is used by attaching the dog collar attachment clip 30 to the collar of the dog to be restrained and the spring clip mechanism 42 of wrist loop assembly 12 to either the upper end of upper restraint bar 14 or to the wrist loop securing bracket 26. The wrist of the user is then placed through the nylon webbing wrist loop 40 and the user's hand used to grasp either the padded hand grip 16 or both the upper and lower rigid restraint bars 14,24.

It can be seen from the preceding description that a hand-held dog restraint has been provided that includes a rigid member that is positionable between the dog handler and the dog; that includes an adjustable length rigid member that can be positioned between the dog and the dog handler; and that includes a rigid upper restraint bar; a user positionable wrist loop assembly securable to the upper end of the upper restraint bar; a padded hand grip provided around the upper end portion of the upper restraint bar; a rigid lower restraint bar; a dual pivot hinge assembly pivotally secured between the upper and lower restraint bars; a sliding locking tube slidable into a locking position covering portions of the upper and lower restraint bar and the dual pivot hinge creating one rigid bar; a wrist loop securing bracket extending from the lower restraint bar and having a securing structure to which the wrist loop assembly is securable; and a nylon strap assembly that is securable about the upper and lower rigid restraint bars to secure the hand-held dog restraint in the collapsed configuration.

It is noted that the embodiment of the hand-held dog restraint described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A hand-held dog restraint comprising:
   a rigid upper restraint bar;
   a user positionable wrist loop assembly securable to an upper end of said upper restraint bar;
   a rigid lower restraint bar;
   a dual pivot hinge assembly pivotally secured between said upper and lower restraint bars;
   a sliding locking tube slidable into a locking position covering portions of said rigid upper restraint bar, said rigid lower restraint bar and said dual pivot hinge assembly;
   a wrist loop securing bracket extending from said lower restraint bar and having a securing structure to which said wrist loop assembly is securable; and
   a strap assembly that is securable about said upper rigid restraint bar and said lower rigid restraint bar to secure said hand-held dog restraint in a collapsed configuration.

2. The hand-held dog restraint of claim 1, further including:
   said rigid upper restraint bar and said rigid lower restraint bar are of equal length.

3. The hand-held dog restraint of claim 2 wherein:
   said wrist loop securing bracket is positioned at a location selected in a manner such that an edge of said sliding locking tube contacts said wrist loop securing bracket when said sliding locking tube is in said locking position.

4. The hand-held dog restraint of claim 2 wherein:
   said wrist loop securing bracket is an eye-bolt.

5. The hand-held dog restraint of claim 4 wherein:
   said wrist loop securing bracket is positioned at a location selected in a manner such that an edge of said sliding locking tube contacts said wrist loop securing bracket when said sliding locking tube is in said locking position.

6. The hand-held dog restraint of claim 2 wherein:
   a padded hand grip provided around an upper end portion of said rigid upper restraint bar.

7. The hand-held dog restraint of claim 6 wherein:
   said wrist loop securing bracket is positioned at a location selected in a manner such that an edge of said sliding locking tube contacts said wrist loop securing bracket when said sliding locking tube is in said locking position.

8. The hand-held dog restraint of claim 6 wherein:
   said wrist loop securing bracket is an eye-bolt.

9. The hand-held dog restraint of claim 8 wherein:
   said wrist loop securing bracket is positioned at a location selected in a manner such that an edge of said sliding locking tube contacts said wrist loop securing bracket when said sliding locking tube is in said locking position.

10. The hand-held dog restraint of claim 1 wherein:
    a padded hand grip provided around an upper end portion of said rigid upper restraint bar.

11. The hand-held dog restraint of claim 10 wherein:
    said wrist loop securing bracket is an eye-bolt.

12. The hand-held dog restraint of claim 11 wherein:
    said wrist loop securing bracket is positioned at a location selected in a manner such that an edge of said sliding locking tube contacts said wrist loop securing bracket when said sliding locking tube is in said locking position.

13. The hand-held dog restraint of claim 10 wherein:
    said wrist loop securing bracket is positioned at a location selected in a manner such that an edge of said sliding locking tube contacts said wrist loop securing bracket when said sliding locking tube is in said locking position.

14. The hand-held dog restraint of claim 1 wherein:
said wrist loop securing bracket is an eye-bolt.

15. The hand-held dog restraint of claim 14 wherein:
said wrist loop securing bracket is positioned at a location selected in a manner such that an edge of said sliding locking tube contacts said wrist loop securing bracket when said sliding locking tube is in said locking position.

16. The hand-held dog restraint of claim 1 wherein:
said wrist loop securing bracket is positioned at a location selected in a manner such that an edge of said sliding locking tube contacts said wrist loop securing bracket when said sliding locking tube is in said locking position.

* * * * *